United States Patent [19]

Gruber et al.

[11] 4,385,132
[45] May 24, 1983

[54] PROCESS FOR THE SEALING OF CONSTRUCTIONS

[75] Inventors: Hermann Gruber, Leverkusen; Hermann Kober, Berg.-Gladbach, both of Fed. Rep. of Germany

[73] Assignee: Bayer Aktiengesellschaft, Leverkusen, Fed. Rep. of Germany

[21] Appl. No.: 318,304

[22] Filed: Nov. 5, 1981

[30] Foreign Application Priority Data

Nov. 13, 1980 [DE] Fed. Rep. of Germany ....... 3042821

[51] Int. Cl.$^3$ ..................... C08G 18/14; C08G 18/32; E21B 33/13
[52] U.S. Cl. .................................. 521/121; 166/295; 521/137; 521/160; 523/132
[58] Field of Search ....................... 521/160, 121, 137; 166/295; 528/67

[56] References Cited

U.S. PATENT DOCUMENTS

| | | | |
|---|---|---|---|
| 3,623,330 | 11/1971 | Nakade et al. | 61/36 R |
| 3,723,163 | 3/1973 | Schumacher | 117/72 |
| 3,798,186 | 3/1974 | Nakade et al. | 260/2.5 A |
| 3,894,131 | 7/1975 | Speech | 521/905 |
| 4,113,014 | 9/1978 | Rubens et al. | 528/67 |
| 4,115,429 | 9/1978 | Reiff et al. | 260/453 SP |
| 4,118,411 | 10/1978 | Reiff | 260/453 SP |
| 4,163,095 | 7/1979 | Kübens et al. | 528/67 |
| 4,171,419 | 10/1979 | Meyer et al. | 528/67 |
| 4,263,161 | 4/1981 | Bartak | 252/182 |

FOREIGN PATENT DOCUMENTS

| | | |
|---|---|---|
| 428592 | 9/1972 | Australia . |
| 259190 | 4/1967 | Austria . |
| 122099 | 12/1976 | Fed. Rep. of Germany . |
| 2713857 | 10/1978 | Fed. Rep. of Germany . |
| 1187117 | 4/1970 | United Kingdom . |
| 1479728 | 7/1977 | United Kingdom . |
| 1486232 | 9/1977 | United Kingdom . |

OTHER PUBLICATIONS

*Lehrbuch Der Organischen Chemie*, (1968), p. 118.
*Encyclopedia of Chemical Technology*, Kirk Othmer, 2nd Edition, 1968, vol. 15, p. 783 and Third Edition, 1982, vol. 18, p. 114.
*Webster's Collegiate Dictionary*, (1976), p. 419.

*Primary Examiner*—H. S. Cockeram
*Attorney, Agent, or Firm*—Gene Harsh; Lawrence S. Pope; Thomas W. Roy

[57] ABSTRACT

The present invention is directed to a process for sealing fissures and leaks in construction by pressing sealing agents comprising liquid compounds having free isocyanate groups, and optionally auxiliary aids and additives, into the constructions to be sealed, characterized in that sealing agents which are substantially free of solvent are used which contain as compounds having free isocyanate groups reaction products of polyhydroxy polyethers with polyisocyanate mixtures of the diphenyl methane series having at least about 20% by weight, based on the weight of the polyisocyanate component, of 2,4′-diisocyanato diphenyl methane, in an NCO/OH equivalent ratio of from about 2:1 to 15:1. The present invention is also directed to the novel sealing agents used in this process.

12 Claims, No Drawings

PROCESS FOR THE SEALING OF CONSTRUCTIONS

BACKGROUND OF THE INVENTION

1. Field of the Invention

This invention relates to sealing agents comprising compounds having free isocyanate groups and to a new process for the sealing of constructions by using these sealing agents.

2. Description of the Prior Art

Various processes have been developed in structural engineering for sealing fissures and leaks in constructions. The simplest method is the use of a pressed-in mortar based on cement/water suspensions. Such suspensions are used for injecting into loose rock floors and fissures, into rock concrete or into brickwork. However, it is no longer practically feasible to compress fissure widths of less than 3 mm using cement emulsions, because the fine cement particles which settle on the sides of the fissure render a faying compression of deep fissures impossible. Injection resins have been developed for compressing fine fissures of less than 3 mm in width and these resins have varying functions. Two areas of use may generally be distinguished: the force-locking bonding of cracked constructions and the sealing of cracked or water-permeable structural elements.

The working method applied is thereby one and the same, the difference lies only in the type of compressed materials. In the case of force-locking bonding, materials are required which have high mechanical strengths and good adhesion characteristics. In this process, a thinly liquid epoxide resin, for example, is pressed into fissures and cavities of the construction using pressures as high as 200 bars, so that after the resin has hardened, a monolithic cohesion again results.

On the other hand, in the case of sealing water-permeable structural elements, materials are required whose hardening is furthered or is at least not disturbed by moisture, which contract minimally during hardening and which have a certain elasticity. Another purpose of use of injection resins arises from the necessity to protect the steel in steel concrete constructions from corrosion. According to current prior art, fissure widths of 0.2 mm are considered harmless for corrosion of the steel under favorable conditions; however, under unfavorable conditions, e.g. under the influence of corrosion-promoting materials, this limit may fall to 0.1 mm. The working procedure comprises the following steps:

1. Injection holes are bored approximately every 10 to 50 cm down to the required injection depth.
2. The fissures on the concrete surface are sealed, e.g. by synthetic resin mortar.
3. So-called packers are inserted into the injection holes. These devices are non-return valves which are self-sealing, when screwed in, by virtue of a rubber collar.
4. The tubes for the pressure reservoir are connected to the packers and the resin is injected with compression until it issues at the neighboring points.

Whereas for the force-locking joins, liquid, cold-hardening epoxide resins are frequently used, polyurethane resins are often used for the sealing procedure.

The known polyurethane binders are formed by mixing a polyisocyanate with a polyhydroxyl compound, whereby the two components react together to form a urethane. Where water is present in the formations to be sealed, carbon dioxide gas evolves as the result of a subsidiary reaction and this gas causes an increase in volume of the sealing resin which is required in this case. Since water is probably present in any case in the constructions to be sealed, even a building material such as concrete which appears to be dry still contains a residual moisture of at least 3.5%, the carbon dioxide gas evolution is a necessary and a chemically-conditioned feature of the sealing procedure.

Investigations should particularly be made from today's point of view of comprehensive environmental hygiene as to what extent ground water, or in certain cases also drinking water, may be contaminated by the synthetic resins injected. Those resins containing solvent might therefore be judged unfavorably. German Offenlegungsschrift No. 2,851,313 and Austrian Pat. No. 259,190 describe insulating liquids containing isocyanate with from 20 to 60% of diisocyanate, whereby the remainder consists of solvent mixtures. The fact cannot be ruled out that some of these solvents pass into the ground water by diffusion and contaminate it. This applies similarly to the preparations containing isocyanate and described in German Auslegeschrift No. 1,914,554 (corresponding to U.S. Pat. Nos. 3,623,330 and 3,798,186) which are to be used for sealing floor formations and underground constructions. In the case of two component systems consisting of mixtures of polyisocyanates and polyols, a separation of the two components before the chemical reaction between the two components is completed must be taken into consideration during injection into foundations through which ground water flows. Among other reasons, this is due to the fact that the water-miscibility or water-solubility of the two components is very different. Therefore, in two component systems, the transition of at least one component into the ground water cannot be discounted.

A further criterion for the assessment of sealing resins is the shrinkage which occurs after hardening. An adequate volume-stability is required after completion of the chemical reaction, whereby a shrinkage extent of from about 10 to 15% may be tolerated. The volume-stability of the hardened synthetic resin is important in that a permanent sealing is required which must not be endangered by volume contraction of the sealing resin. It is obvious that isocyanate derivatives containing solvent may not be volume-stable through evaporation of the solvent.

A sufficiently low viscosity is naturally necessary for the suitability of isocyanate resins for fissure compression, so that the transport of the sealing resin in the construction constitution may take place rapidly enough.

This invention is therefore directed to providing a new process for the sealing of constructions, in which sealing agents are used which only contain one binder component to avoid contamination in the ground and drinking water with extensive elimination of solvents and which also only exhibit slight shrinkage after hardening.

This object may be achieved by the process according to the invention which is described in more detail in the following.

SUMMARY OF THE INVENTION

The present invention is directed to a process for sealing fissures and leaks in construction by pressing sealing agents comprising liquid compounds having free isocyanate groups, and optionally auxiliary aids and additives, into the constructions to be sealed, characterized in that sealing agents which are substantially free of solvent are used which contain as compounds having free isocyanate groups reaction products of polyhydroxy polyethers with polyisocyanate mixtures of the diphenyl methane series having at least about 20% by weight, based on the weight of the polyisocyanate component, of 2,4'-diisocyanato diphenyl methane, in an NCO/OH equivalent ratio of from about 2:1 to 15:1. The present invention is also directed to the novel sealing agents used in this process.

DETAILED DESCRIPTION OF THE INVENTION

The sealing agents used in the process according to the invention contain as the essential component, i.e. as the binder, reaction products having free isocyanate groups of polyisocyanate mixtures of the diphenyl methane series having at least about 20% by weight, based on the total weight of the polyisocyanate component, of 2,4'-diisocyanato diphenyl methane, with polyether polyols in an NCO/OH equivalent ratio of from about 2:1 to 15:1, preferably from about 4:1 to 10:1.

The polyisocyanate mixtures of the diphenyl methane series suitable for the production of the reaction products mentioned are mixtures which, based on the total mixture, contain at least about 20% by weight, generally from about 20 to 80% by weight and preferably from about 30 to 70% by weight of 2,4'-diisocyanato-diphenyl methane. In addition to these 2,4' isomers, the polyisocyanate component generally contains other isomeric or homologous polyisocyanates of the diphenyl methane series. This means that the polyisocyanate component is generally either a mixture of 2,4'-diisocyanato-diphenyl methane with 4,4'-diisocyanato-diphenyl methane and optionally with from about 0 to 20% by weight, based on the total mixture, of 2,2'-diisocyanato-diphenyl methane or a mixture of these isomers with polynuclear polyphenyl-polymethylene-polyisocyanates. The last-mentioned mixture, generally also contains from about 10 to 60% by weight, based on the total mixture, of such polynuclear polyisocyanates. The first-mentioned mixture may be obtained, for example, by distilling off a diisocyanate of the specified composition from a polyisocyanate mixture, as it is produced by phosgenation of aniline/formaldehyde-condensates. The equally suitable mixture containing polynuclear polyisocyanates may be obtained, for example, by re-mixing the last-mentioned distillation product with a phosgenation product depleted in 4,4'-diisocyanato-diphenyl methane according to German Auslegeschrift No. 1,923,214. It is also possible directly to obtain such a mixture, i.e. a polyisocyanate mixture, with a content of 2,4'-diisocyanato-diphenyl methane which corresponds to the limits essential to the invention, by a corresponding control of the aniline/formaldehyde-condensation. U.S. Pat. No. 3,277,173 describes, by way of example, a method for obtaining polyamine mixtures of the diphenyl methane series having a high content of 2,4'-diamino diphenyl methane. The usable polyisocyanates may be directly obtained by phosgenating these condensates rich in 2,4'-diamino diphenyl methane. German Offenlegungsschrift No. 1,937,685 and U.S. Pat. No. 3,362,979 also indicate methods for obtaining such polyisocyanate mixtures. Polyisocyanate mixtures which are particularly suitable consist of the following:

(a) from about 0 to 5% by weight of 2,2'-diisocyanato-diphenyl methane;
(b) from about 20 to 80, preferably from about 30 to 70% by weight of 2,4'-diisocyanato diphenyl methane; and
(c) from about 80 to 20, preferably from about 70 to 30% by weight of 4,4'-diisocyanato diphenyl methane and/or higher than difunctional polyisocyanates of the diphenyl methane series.

This preferred polyisocyanate mixture exhibits a viscosity of less than about 200 cP at 20° C. It is particularly preferred to use a mixture of the type mentioned, in which component (c) consists exclusively of 4,4'-diisocyanato diphenyl methane.

Polyether polyols suitable for the production of the reaction products mentioned are any polyether polyols generally having from about 2 to 4, preferably 2 or 3 hydroxyl groups and with a molecular weight of from about 800 to 6000, preferably from about 1000 to 4000 or mixtures of such polyethers. They may be obtained in known manner by addition of ethylene oxide and/or propylene oxide to suitable starting components. In the production of the polyethers, the alkylene oxides mentioned may also be used in admixture or successively. Suitable starting components are e.g. water, ethylene glycol, propylene glycol -1,2, trimethylol propane, glycerine or ethylene diamine.

The reaction products having free isocyanate groups are produced in known manner by reacting the components in the quantity ratios specified at from about 15° to 100° C., preferably from about 20° to 50° C. The reaction products thus obtained generally exhibit a viscosity of from about 1000 to 5000 mPas at 20° C.

The sealing agents used in the process according to the invention generally contain from about 40% to 100% by weight, preferably from about 50 to 95% by weight of the reaction products mentioned. In addition thereto, the sealing agents may also contain auxiliary aids and additives. These are, for example, conventional catalysts used in polyurethane chemistry, such as tertiary amines or organic metal compounds; softeners, in particular those which are characterized by a resistance with respect to the alkaline components of the constructions e.g. phosphoric acid ester, and reaction products of chlorosulphonated paraffin with phenol and phenol derivatives, which softeners are often used in quantities of up to about 60%, preferably from about 5 to 50% by weight, based on the total weight of the sealing agent; pigments in powder form or as color pastes; inorganic fillers e.g. sand, kaolin, chalk, barium sulphate or silicon dioxide; emulsifiers; flameproofing agents; anti-ageing agents or bonding agents. The polyether polysiloxanes known from polyurethane foam chemistry may also be used simultaneously to stabilize the foam structures produced by carbon dioxide evolution. Although the sealing agents to be used in the process according to the invention are substantially solvent-free systems, the simultaneous use of up to about 15%, preferably up to about 5% by weight, based on the total weight, of low-boiling solvents, e.g. ethyl acetate, butyl acetate or methyl ethyl ketone is not excluded in principle, in order thereby to achieve an improved wetting of the construction to be sealed. However, in the process according to the invention, the sealing agents are most preferably completely free of solvent.

In order to carry out the process according to the invention, the sealing agents which generally exhibit a viscosity of from about 500 to 2000 mPas at 20° C., are injected into the construction to be sealed, for example according to the four-step procedure previously outlined. The chemical reaction leading to sealing and taking place after the sealing agent has been injected is substantially attributed to the reaction of the free isocyanate groups with water (moisture) present in the construction to be sealed. The plastics causing the sealing effect and resulting from this reaction are characterized in particular by a shrinkage extent which is below about 10%, so that a permanent sealing of the constructions is allowed with the process according to the invention. Moreover, there is no danger of a negative influence on ground and drinking water in the implementation of the present process. Another advantage is seen in the low isocyanate vapor pressure of the sealing agents essential to the invention, as a result of which, the cost of protective working measures may be suppressed accordingly.

The process according to the invention is suitable for sealing the following, for example: tunnel constructions, concrete walls, underground dams, tunnels for drinking water and effluent, railway and canal bridges, walls and foundations of churches and sacral buildings, underground and tram constructions, fissures in cooling towers, sheet piling and mine walls or damp cellar walls.

The percentages specified in the following Examples relate to percentages by weight unless otherwise specified.

EXAMPLES

Example 1

Production of a solvent-free sealing agent 1000 g of a prepolymer having isocyanate groups, which was obtained by reacting 100 g of a mixture of 30% by weight of 2,4'-diisocyanato diphenyl methane and 70% by weight of 4,4'-diisocyanato diphenyl methane with a mixture of 40 g of polypropylene glycol of molecular weight of 1000 and 40 g of a polyether polyol of molecular weight of 3700, obtained by propoxylating ethylene diamine, are mixed with stirring with 500 g of a softener based on a reaction product of chlorosulphonated paraffin with cresol.

6 g of dibutyl tin dilaurate as the catalyst and 10 g of a commercially available polyalkylene oxide-polysiloxane-copolymer as the stabilizer are then successively stirred in.

The ready-for-use sealing agent thus obtained has an NCO content of 9.9% and exhibits a viscosity of approximately 720 mPas at 23° C.

Example 2

Testing the shrinkage behavior

6% by weight of water are emulsified in 50 g of the sealing agent described in Example 1, in a cylindrical vessel provided with an opening of 6 cm width and of a height of 20 cm. The polyurea formation which commences immediately leads to hardening and in concluded in approximately 5 minutes at 23° C. to an extent such that the expansion conditioned by the evolution of carbon dioxide gas is completed. The volume of the hardened sealing mass is 720 ml. After checking the volume after storing at room temperature for one, three and seven days, only slight changes in volume of approximately 9% were established.

Example 3

Experiment in practice on a water-permeable concrete wall

The slitted concrete wall of a drain is slightly cracked and water-permeable in the lamellar joint. The average fissure width is approximately 2 or 3 mm. Holes of 20 mm in diameter and from 50 to 60 cm deep are drilled along the vertically extending fissure in a spacing of from 20 to 30 cm. After packers have been inserted, the sealing agent described in Example 1 is injected under pressure. The process is carried out such that enough sealing material is pressed in, increasing from below upwards, until surplus resin is pressed out in the region of the packer. The material consumption varies and partly amounts to several kilos per hole drilled. After completion of the injection workings, water no longer runs out of the sealed fissure and 24 hours after completion of the workings, it is observed that the wet concrete walls are starting to dry out. The sealing is elastic, effectively adhesive, permanent and does not require any retouching work.

Example 4

The compatibility with drinking water of the sealing agent produced according to Example 1 was tested according to the following process:

The sealing agent reacted according to Example 2 was brought into contact with drinking water after hardening such that a contact surface of 400 cm$^2$ on 10 l of water was attained. After a residence time of 30 days, the result of subsequent examination of the water showed no clouding and no change as regards odor or taste. An assessment of the total dissolved organic carbon (TOC) gave a value of 1.6 mg/l.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for sealing a fissure or leak in constructions by pressing a sealing agent comprising a liquid compound having free isocyanate groups and optionally auxiliary aids or additives into the constructions to be sealed, and reacting said sealing agent with water present in said constructions characterized in that said sealing agent has a viscosity of from about 500 to 2000 mPas at 20° C., contains up to about 15% by weight of solvent, based on the weight of said sealing agent, and additionally contains, as the compound having free isocyanate groups, the reaction product of a polyhydroxy polyether with a polyisocyanate mixture of the diphenyl methane series having at least about 20% by weight, based on the weight of the polyisocyanate component, of 2,4'-diisocyanato diphenyl methane, in an NCO/OH equivalent ratio of from about 2:1 to 15:1, and wherein said reaction product has a viscosity of from about 1000 to 5000 mPas at 20° C., said sealing agent containing sufficient solvent or softening agent to achieve its final viscosity.

2. The process according to claim 1, characterized in that the sealing agent contains from about 50 to 95% by weight, based on the total mixture, of the compound having free isocyanate groups.

3. The process according to claim 1, characterized in that said polyisocyanate mixture comprises
  (a) from about 0 to 5% by weight of 2,2'-diisocyanato diphenyl methane,
  (b) from about 20 to 80% by weight of 2,4'-diisocyanato diphenyl methane, and
  (c) from about 20 to 80% by weight of 4,4'-diisocyanato diphenyl methane and/or higher than difunctional polyisocyanates of the diphenyl methane series.

4. The process according to claim 1, 2 or 3 characterized in that the sealing agent contains from about 5 to 50% by weight, based on the total mixture, of a softener.

5. A process according to claim 4, characterized in that the softener is the reaction product of a chlorosulphonated paraffin with phenol or phenol derivatives.

6. The process according to claim 3 wherein component (c) consists essentially of 4,4'-diisocyanato diphenyl methane.

7. A sealing agent having a viscosity of from about 500 to 2000 mPas at 20° C. which comprises
  (a) from about 50 to 95% by weight of the liquid reaction product of a polyhydroxyl polyether with a polyisocyanate mixture of the diphenyl methane series having at least about 20% by weight, based on the weight of the polyisocyanate component, of 2,4'-diisocyanato diphenyl methane, in an NCO-/OH equivalent ratio of from about 2:1 to 15:1, wherein said liquid reaction product has a viscosity of from about 1000 to 5000 mPas at 20° C. and
  (b) from about 5 to 50% by weight of a softening agent, and
  (c) up to about 15% by weight of an organic solvent.

8. The sealing agent of claim 7 wherein said softening agent is the reaction product of a chlorosulphonated paraffin with phenol or phenol derivatives.

9. The sealing agent of claim 7 or 8 wherein said polyisocyanate mixture comprises
  (a) from about 0 to 5% by weight of 2,2'-diisocyanato diphenyl methane,
  (b) from about 20 to 80% by weight of 2,4'-diisocyanato diphenyl methane, and
  (c) from about 20 to 80% by weight of 4,4'-diisocyanato diphenyl methane and/or higher than difunctional polyisocyanate of the diphenyl methane series.

10. The sealing agent of claim 9 wherein component (c) consists essentially of 4,4'-diisocyanato diphenyl methane.

11. The process of claim 1 wherein said sealing agent contains a foam stabilizing amount of a polyether-polysiloxane.

12. The sealing agent of claim 7 wherein said sealing agent contains a foam stabilizing amount of a polyether-polysiloxane.

* * * * *